C. J. GETERMAN.
TROLLEY STAND OR BASE.
APPLICATION FILED JUNE 4, 1908.
912,556.
Patented Feb. 16, 1909.
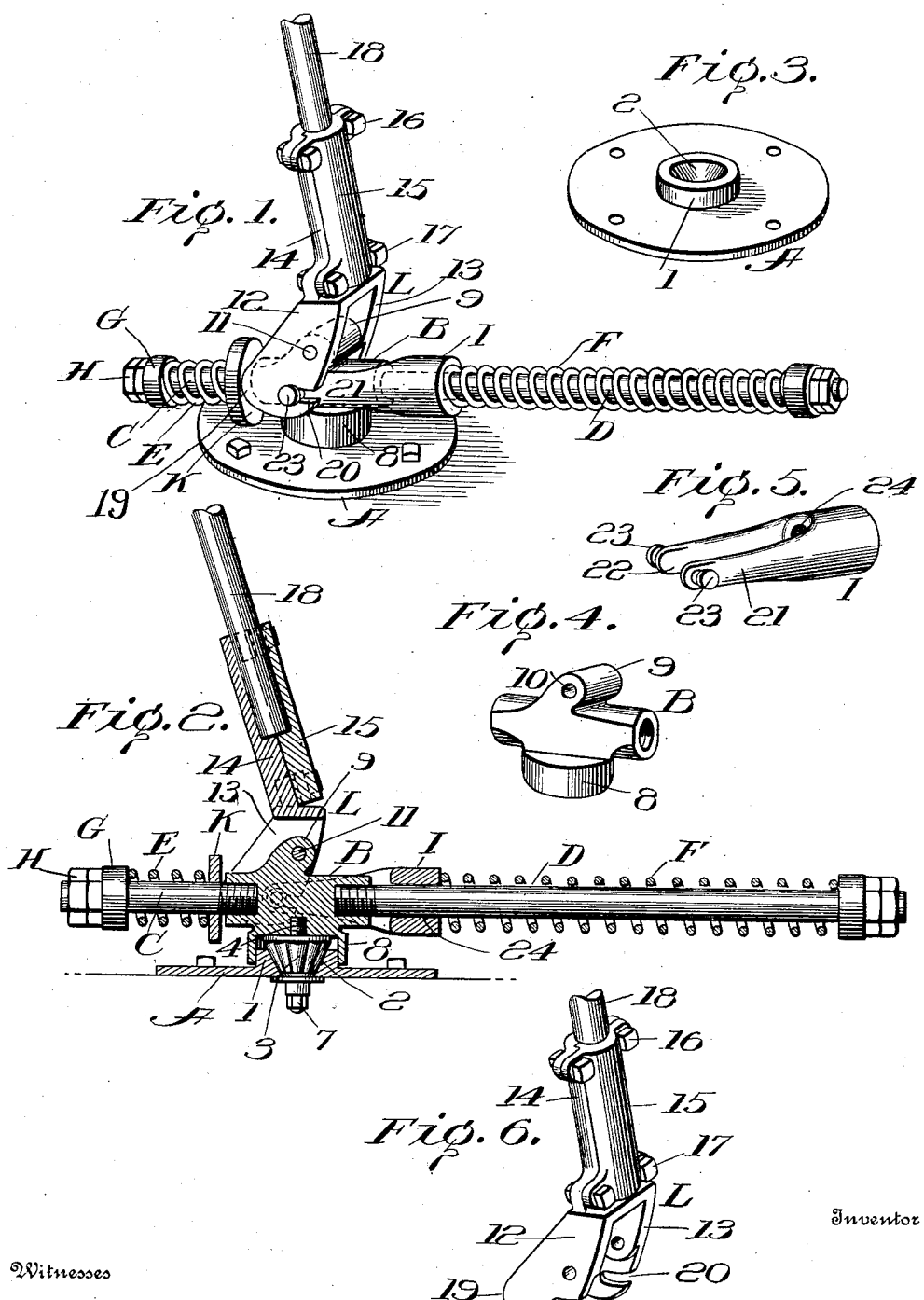

UNITED STATES PATENT OFFICE.

CHARLES J. GETERMAN, OF CANTON, OHIO, ASSIGNOR TO JOHN E. McLAIN, OF CANTON, OHIO.

TROLLEY STAND OR BASE.

No. 912,556.　　　　　Specification of Letters Patent.　　　　Patented Feb. 16, 1909.

Application filed June 4, 1908. Serial No. 436,728.

*To all whom it may concern:*

Be it known that I, CHARLES J. GETERMAN, a citizen of the United States, residing at Canton, in the county of Stark and State of Ohio, have invented certain new and useful Improvements in Trolley Stands or Bases, of which the following is a specification, reference being had therein to the accompanying drawings.

This invention relates to means for supporting trolley poles, such means being known in the art as trolley stands or trolley bases.

The object of the invention is to simplify the construction and operation of trolley stands or bases and to make one which is highly durable and efficient.

In the accompanying drawings, which illustrate the invention—Figure 1 is a perspective view of the stand, showing it in side elevation; Fig. 2 is a central vertical section of the stand; Fig. 3 is a perspective view of the top of the base; Fig. 4 is a view of the rotary support; Fig. 5 is a view of the sliding cross head through which the elevating spring acts upon the pole; and Fig. 6 is a perspective view of the trolley pole carrier.

Referring to the drawings—the apparatus comprises a base A upon which is mounted a rotatable support B. From the support B, upon opposite sides thereof, extends rods C and D. These rods may be separate or they may be one continuous piece extending through the central part of the support. Upon the rod C is placed a compression spring E and upon the rod D is placed a compression spring F. At the outer end of the rod C is a stop for the spring E which may be a collar G held from slipping off the free end of the rod by the lock nuts H. A similar stop is provided at the outer end of the rod D. Between the elevating spring F and the support B a cross head I slides upon the rod D, while between the buffer spring E and the rotary support there is a second cross head K which slides upon the rod C.

Pivoted to the support B is a trolley pole carrier or socket L which bears alternately against the cross head K or the cross head I as the free end of the trolley pole is thrown from one side to the other of the support B. As the said carrier thus bears directly against these cross heads and is not connected thereto it may have movement independent thereof and links or other intervening mechanism are done away with thereby simplifying the apparatus.

The base A is secured to the top of a car in any suitable manner and has a boss 1 within which is an aperture 2 having conical walls as shown, which constitute one part of a conical bearing.

The rotatable support B comprises a cone-shaped roller bearing adapted to engage with the walls of the aperture 2. The rollers 3 of this bearing may be arranged about the stud 4 projecting from the bottom of the rotary support in any suitable and well known manner. The support B is held in position upon the boss 1 by means of a nut 7 screwed on to the end of the stud 4. Surrounding the said roller bearing is a collar 8 which extends downward from the bottom of the rotary support so that when the rotary support is in position upon the base, this collar incloses the boss 1, thereby forming a joint which protects the bearing from dust.

The central part of the rotary portion B will preferably be cast and as before stated the rods C and D may be continuous therethrough or be separately formed. From the upper portion of this central casting extends a lug 9 having a hole 10 through which extends the pin or shaft 11 by which the trolley carrier L is pivoted.

The lower portion of the trolley carrier L is bifurcated to form the legs 12 and 13 which extend outside the rotary support upon opposite sides thereof. The upper end of the trolley pole carrier comprises a socket proper which is preferably formed in two parts 14 and 15, of which 14 is integral with the legs 12, 13 and the part 15 is adapted to be secured to the part 14 by means of bolts 16, 17. A portion of a trolley pole 18 is shown extending from the socket.

It will be noted that the carrier L is pivoted to the rotary support B at a point above the center line of the springs. Below this pivotal point the said legs 12, 13 are each provided with a cam surface as 19 adapted to bear against the cross head K and move the same against the inner end of the spring E when the trolley pole is in or near to its vertical position. Also below the pivot of the carrier, the said legs are provided with open ended slots as 20. The cross head I is bifurcated to form the rearwardly extending legs 21 and 22 as shown and the extremities of these legs are borne against by the trolley pole carrier L so that when the free end of the trolley pole is depressed in use the cross head I will compress the spring F from its inner end. In order to maintain the cross head and carrier in proper relation pins as 23 are provided upon the extremities of the legs of the cross head, which pins take into the open ended slots in the carrier. The hole 24 through the cross head I to receive the rod D is preferably sufficiently large to permit a slight vertical rocking of the cross head on the rod. If now it be assumed that the trolley pole 18 is depressed on the left, the apparatus being viewed as in Fig 1, and the trolley placed upon the wire, the elevating spring F will be compressed from its inner end and will force the trolley pole toward the wire. Should the trolley jump the wire, the free end of the pole 18 will fly upwardly and when it is near to or in its vertical position, the cam faces 19 on the lower end of the trolley carrier L will engage and force the cross head K against the buffer spring E so that the movement of the arm will be cushioned and restrained. This movement, however, will not be sufficient to carry the pins as 23 outside the slots 20 in the pole carrier. It is to be observed that the cross head K is shown as a washer or collar; that is to say, it has a continuous surface about the rod upon which it slides so that regardless of any movement which it may have about the rod, a suitable face will always be presented for the action of the cam faces referred to.

What I claim is—

1. In a trolley stand, the combination with a rotary support of a rod extending therefrom, a compression spring upon said rod, a stop at the outer end of said rod, a cross head rigid throughout and mounted to slide upon said rod between said support and said spring, and a trolley pole carrier pivoted upon said rotary support and extending at either side below its pivotal point outside of said support and bearing directly against the rear end of said cross head at a point below the pivot of the carrier whereby the spring is compressed as the free end of the trolley pole is depressed.

2. In a trolley stand, the combination with a rotary support, of a rod extending therefrom, a compression spring upon said rod, a stop for said spring at the outer end of said rod, a cross head rigid throughout and mounted to slide upon said rod between said support and said spring, and a bifurcated trolley pole carrier pivoted upon said support and having its legs extending below the said pivot upon the outside of said support on opposite sides thereof, the said legs bearing directly against the rear end of said cross head at a point below the pivotal point of said carrier whereby the spring is compressed as the trolley pole is depressed.

3. In a trolley stand, the combination with a rotary support, of a rod extending therefrom at one side, a compression spring upon said rod, a stop for said spring at the outer end of said rod, a bifurcated cross head rigid throughout and mounted to slide upon said rod between said support and said spring, and a bifurcated trolley pole carrier pivoted to said support and having its legs extending below its pivotal point at either side of said support, the legs of said carrier bearing against the rear end of the legs of said cross head at a point below the pivotal axis of said carrier.

4. In a trolley stand, the combination with a rotary support, of a rod extending therefrom at one side, a compression spring upon said rod, a top for said spring at the outer end of said rod, a bifurcated cross head rigid throughout and mounted to slide upon said rod between said support and said spring, and a bifurcated trolley pole carrier pivoted to said support and having its legs extending below its pivotal point at either side of said support, the legs of said carrier bearing directly against the legs of said cross head at a point below the pivotal axis of said carrier, the said carrier and cross head being maintained in proper relation by pins upon one extending into open ended slots in the other.

5. In a trolley stand, the combination with a rotary support, of rods extending from opposite sides thereof, a buffer spring upon one of said rods, an elevating spring upon the other of said rods, stops for said spring upon the outer ends of said rods, a cross head between said elevating spring and said support, a second cross head between said buffer spring and said support, a trolley pole carrier pivoted upon said support and adapted to bear alternately against said cross heads to compress first one and then the other of said springs from its inner end.

6. In a trolley stand, the combination with a rotary support, of rods extending from opposite sides thereof, a buffer spring upon one of said rods, an elevating spring upon the other of said rods, stops for said springs at the outer ends of said rods, a cross head between said elevating spring and said support, a second cross head between said buffer spring and said support, a trolley pole carrier pivoted upon said support, said carrier having a cam surface adapted to bear against the cross head for compressing the buffer spring and said carrier bearing against the first mentioned cross head for compressing the elevating spring.

7. In a trolley stand, the combination with a rotary support, of rods extending therefrom upon opposite sides, a buffer spring upon one of said rods, an elevating spring upon the other of said rods, stops for said springs at the outer ends of said rods, a cross head between said elevating spring and said support, a second cross head between said buffer spring and said support, and a trolley pole carrier pivoted to said support, said carrier having a cam surface below its pivotal point for engagement with said second cross head to compress the said buffer spring, said carrier being also adapted to bear, at a point below its pivot, against the first mentioned cross head to compress the elevating spring.

8. In a trolley stand, the combination with a rotary support, of rods extending therefrom upon opposite sides, an elevating spring upon one of said rods, a buffer spring upon the other of said rods, stops for said springs at the outer ends of said rods, a cross head between said elevating spring and said support, a cross head between said buffer spring and said support, a bifurcated trolley pole carrier having its legs extending below the pivotal point of said carrier, said legs being adapted, below said pivotal point, to alternately bear against one of said cross heads to compress the elevating spring and against the other cross head to compress the buffer spring.

In testimony whereof I affix my signature, in the presence of two witnesses.

CHARLES J. GETERMAN.

Witnesses:
C. A. COCHENOUR,
H. A. STALEY.